April 7, 1964  E. F. VÖGELI  3,127,905

VALVE SEAT UNIT

Filed Feb. 28, 1961  2 Sheets-Sheet 1

Inventor:
ERNST F. VÖGELI
K. A. Mayr
Attorney:

April 7, 1964  E. F. VÖGELI  3,127,905
VALVE SEAT UNIT
Filed Feb. 28, 1961  2 Sheets-Sheet 2
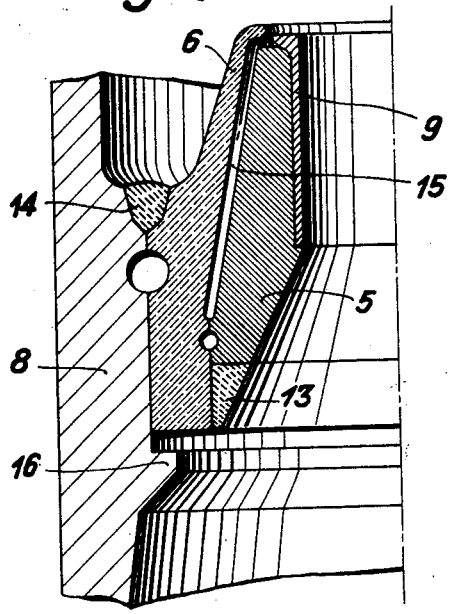
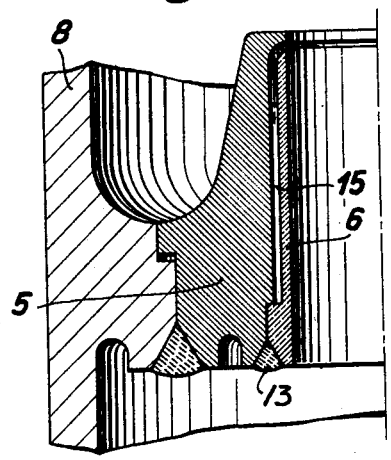
Inventor:
ERNST F. VÖGELI
By K. A. Mayr
Attorney:

United States Patent Office  3,127,905
Patented Apr. 7, 1964

3,127,905
VALVE SEAT UNIT
Ernst F. Vögeli, Wiesendangen, Switzerland, assignor to Sulzer Freres, S.A., Winterthur, Switzerland, a corporation of Switzerland
Filed Feb. 28, 1961, Ser. No. 92,302
Claims priority, application Switzerland Mar. 9, 1960
4 Claims. (Cl. 137—334)

This invention relates to improvements in valve seat units and more particularly to valve seat units of the type adapted to restrict and pass compressible medium such as high-temperature gases and vapors.

One application for such units is in the piping of steam power plants.

In such application cracks may occur in the valve seat member on the insides of the valve seat and may lead to the complete destruction of the valve seat member.

This damage can be caused by thermal stressing produced in operation because the fluid medium being passed at high speed has a high entry temperature outside the valve seat but a lower temperature as it expands across the valve seat.

The result is a considerable flow of heat, that is, a temperature flow gradient between the outside of the valve seat and the inside thereof where the fluid medium flows at high speed.

It is an object of this invention to provide an improved valve seat unit with means reducing the temperature flow gradient through the valve seat member to eliminate cracking of the valve seat and destruction of the efficiency of the valve seat member.

A further object of the invention is to provide an improved valve seat member adapted to provide a sufficiently low heat flow gradient therethrough to avoid cracking of the valve seat under the conditions described above.

In another aspect of the invention it is an object to provide means associated with the valve seat member and readily replaceable without dismantling the valve seat member, which will provide a reduction in the heat flow gradient through said valve seat member.

A further object is to provide for a valve seat unit having a valve seat member for passing a high-temperature compressible medium simple, effective means for reducing the heat flow gradient through said valve seat member.

A further object is to provide for a valve seat unit having a valve seat member for passing a high-temperature compressible medium resilient heat retarding means effective to reduce the heat flow gradient through said valve seat member while at the same time avoiding damage which may otherwise result due to unequal expansion of different materials in the retarding means and the valve seat member.

In general the invention contemplates the provision of means associated with the valve seat member including, for example, stagnant fluid pockets, and/or protective covers or shields to reduce the heat flow gradient through the valve seat member.

Further objects and advantages of the invention will be apparent to those skilled in the art from a review of the following description and claims and the accompanying drawings in which:

FIGS. 2 through 5 are longitudinal sectional views of various valve seat units including associated housings and heat transfer retarding elements according to the invention.

In the several figures like character references are applied to identical or similar elements.

Figure 1:
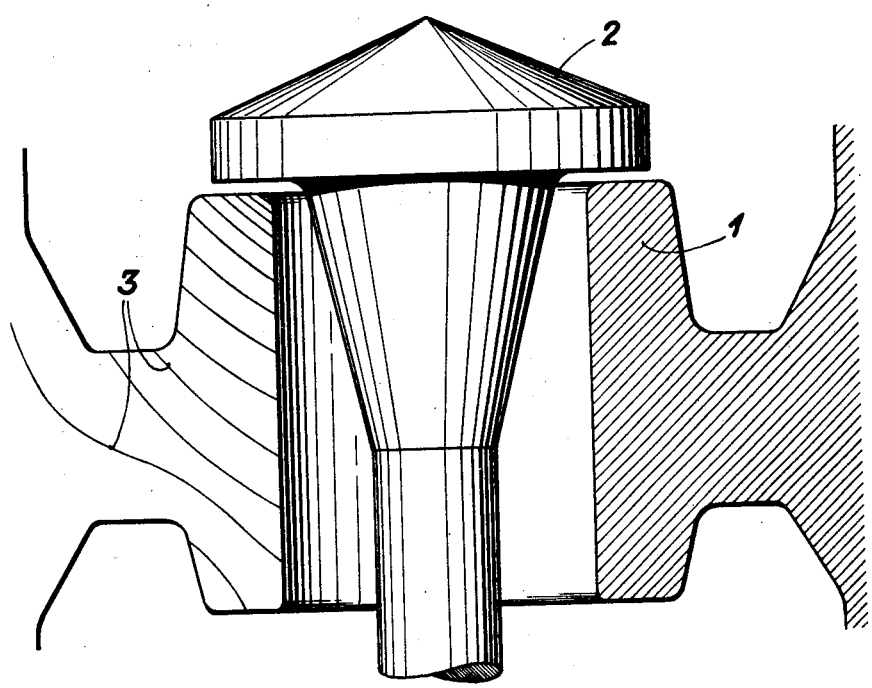
FIG. 1 is a side elevation partly in cross-section of a conventional design of a valve seat unit used to further explain the heat flow gradient problem.

Referring to the drawings, FIG. 1 illustrates a conventional design for a valve of the kind specified, comprising a valve seat member 1 and a valve member 2; on the left-hand side of FIG. 1 heat flow lines 3 are shown instead of the hatching on the right-hand side of the drawing. The lines 3 are densest at the top inner edge of the seat which is, therefore, where the temperature gradient is at a maximum. It is found in practice that cracks often start at this edge in operation.

According to the invention to reduce heat cracks in the valve seat member means are provided to reduce the flow of heat through the valve seat member wall. Thus the valve seat member is provided with a protective covering or shield made of a substance which is a poorer heat conductor than the valve seat member. The protective covering or jacket can be disposed opposite either the inner or outer generated surface of the valve seat member. According to another feature of the invention, the valve seat member comprises a protective covering or shield so connected thereto that a gap containing stagnant medium is left between the protective covering and the valve seat member. Here again the protective covering can be disposed either on the outside or the inside of the valve seat member.

Figures 2, 3:
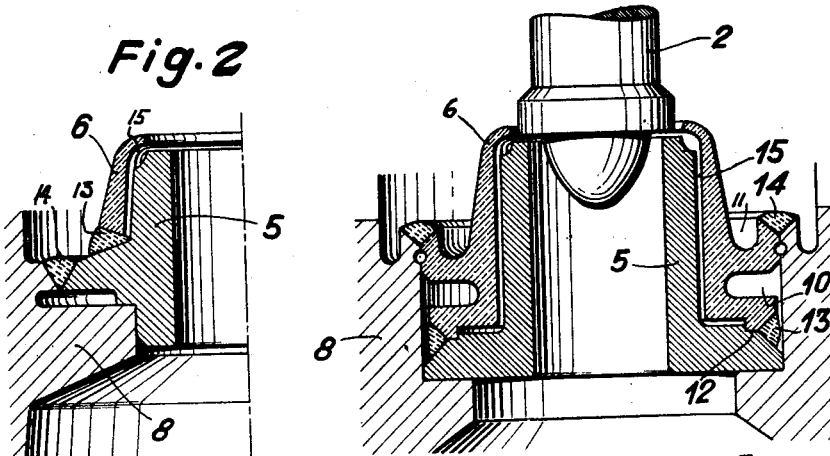

Referring to FIG. 2 there is shown in longitudinal cross-section a valve seat member 5 and a jacket element or protective shield 6 according to another form of the invention. The valve seat member 5 is supported by a housing 8 and fixed thereto by suitable means, as for example, a weld 14. The protective shield 6, made of ceramic or other suitable material of lower heat conductivity than the valve member 5, is fixed by suitable means, as for example weld 13, to the member 5 and is curved to follow and protect the outer surface of the member 5. The shield 6 is spaced from the member 5 to leave a gap or pocket 15 which contains a stagnant medium at fluid entry pressure. The inward flow of heat from the entry side of the valve seat unit through the valve seat member is reduced by the shield 6 and the pocket 15 to thereby lower the heat flow gradient through the valve seat member 5.

FIG. 3 illustrates a modification of the invention in which the protective shield 6 is fixed to the valve seat member 5 and housing 8 by the respective welds 13 and 14 and is recessed as at 10 and 11 to afford resilient pressing of the shield against an abutment 12. Sealing tightness between the valve seat member 5 and the casing 8 is provided by the welds 13 and 14, the weld 13 being produced before the seat member 5 is fitted into the casing. As in FIG. 2, stagnant medium at the entry pressure is present in the pocket 15 left between the shield 6 and the valve seat member 5.

In the modified form of the invention as shown in FIG. 4 the valve seat member 5 is secured to a shield or jacket 6 by a weld 13. The protective shield 6 is spaced from the outer contour of the member 5 by the pocket 15 and fixed to the housing 8 by the weld 14. The shield 6 is provided with annular recesses to provide resiliency. One advantage of the embodiment shown in FIG. 4 is that the valve seat member 5 is radially resiliently connected to the casing 8. Should the weld 14 between the protective shield and the casing fracture, a collar 16 prevents the valve seat member from being carried away. The valve seat member is lined with a heat-resistant substance 9.

Referring to the valve seat member shown in FIG. 5, the protective shield 6 is disposed in the form of a thin sleeve opposite the inner generated surface of the valve seat member 5 and is connected thereto at its bottom end by weld 13. The heat-insulating pocket 15 contains stagnant medium at the entry pressure when the associated apparatus is in operation. By using a screw- or other releasable connection in lieu of the weld 13 the shield 6, which experience shows may be eroded in operation, can readily be replaced without any need to dismantale the complete seat member.

It will be noted that in the embodiments of the invention illustrated in FIGURES 3 to 5 either the valve seat element or the protective element is provided with a lip portion adjacent to the valve seat and overlying the open end of the clearance between said elements.

While a limited number of embodiments of the invention have been illustrated and described, it will be readily apparent those skilled in the art that various changes and modifications can be made without departing from the spirit and scope of the invention and all such changes and modifications are intended to be included in the attached claims.

I claim:

1. A valve seat unit for passing a high temperature compressible fluid having different temperatures on the input and output sides of the unit, comprising:
   a valve seat element having an annular end surface forming a valve seat,
   said valve seat element having a circular portion coaxial of said valve seat,
   a protective element having a circular portion corresponding to said circular portion of said seat element and being placed concentrically of said circular portion of said seat element,
   a narrow clearance between said valve seat element and said protective element, said clearance having an open end adjacent to said valve seat,
   one of said elements having a lip portion adjacent to said valve seat and overlying said open end,
   said elements being constructed and arranged so as to close the opposite end of said clearance, and
   a stagnant fluid in said clearance for impeding heat flow through said valve seat element.

2. A valve seat unit as defined in claim 1 wherein said protective element is disconnectably and replaceably connected to said seat element.

3. A valve for passing a high temperature compressible fluid having different temperatures on the input and output sides of the valve, comprising:
   a valve housing,
   a valve seat unit in said valve housing,
   said valve seat unit including:
   a valve seat element having an annular end surface forming a valve seat,
   said valve seat element having a circular outer surface portion coaxial of said valve seat,
   a jacket element having a circular inner surface portion corresponding to said outer surface portion of said seat element and being placed concentrically of and opposite said outer surface portion of said seat element,
   a narrow clearance between said opposite surface portions, said clearance having an open end adjacent to said valve seat,
   one of said elements having a lip portion adjacent to said valve seat and overlying said open end,
   said elements being constructed and arranged so as to close the opposite end of said clearance, and
   a stagnant fluid in said clearance for impeding heat flow through said valve seat element,
   said housing having a surface portion normal to the longitudinal axis of the valve,
   said valve seat element having a surface portion resting on said surface portion of said housing,
   said jacket element having an intermediate portion rigidly connected to said valve housing and having an end portion rigidly connected to said valve seat element,
   the part of said jacket element between said intermediate portion and said end portion which is rigidly connected to said valve seat element, being resilient for resiliently pressing said valve seat element onto said surface portion of said valve housing.

4. A valve seat unit for passing a high temperature compressible fluid having different temperatures on the input and output sides of the unit, comprising:
   a valve seat element having an annular end surface forming a valve seat,
   said valve seat element having a circular inside surface portion coaxial of said valve seat,
   a protective element having a circular outside surface portion corresponding to said surface portion of said seat element and being placed concentrically of and opposite said surface portion of said seat element,
   a narrow clearance between said opposite surface portions, said clearance having an open end,
   one of said elements having a lip portion adjacent to said valve seat and overlying said open end,
   said elements being rigidly connected to each other at the second end of said clearance and closing said clearance thereat, and
   a stagnant fluid in said clearance for impeding heat flow through said valve seat element.

References Cited in the file of this patent

UNITED STATES PATENTS

| | | |
|---|---|---|
| 1,530,047 | Hellan | Mar. 17, 1925 |
| 1,899,154 | Karrick | Feb. 28, 1933 |
| 2,726,843 | Evans et al. | Dec. 13, 1955 |
| 2,736,529 | Songer | Feb. 28, 1956 |
| 2,930,575 | Britton | Mar. 29, 1960 |
| 3,030,977 | Werner | Apr. 24, 1962 |
| 3,040,773 | McInerney | June 26, 1962 |

FOREIGN PATENTS

| | | |
|---|---|---|
| 842,571 | Germany | of 1952 |
| 905,019 | Germany | of 1954 |